United States Patent Office 3,839,550
Patented Oct. 1, 1974

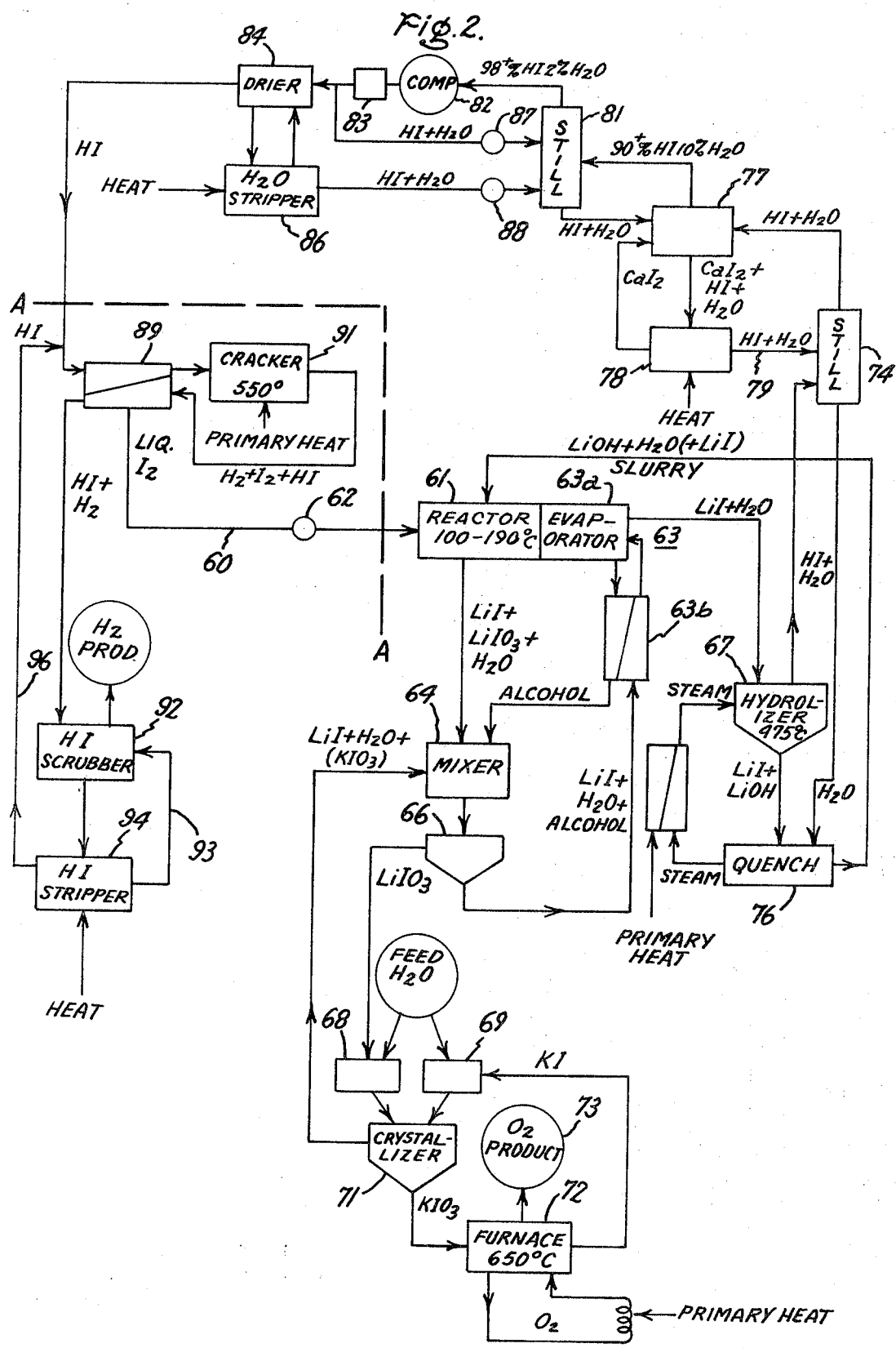

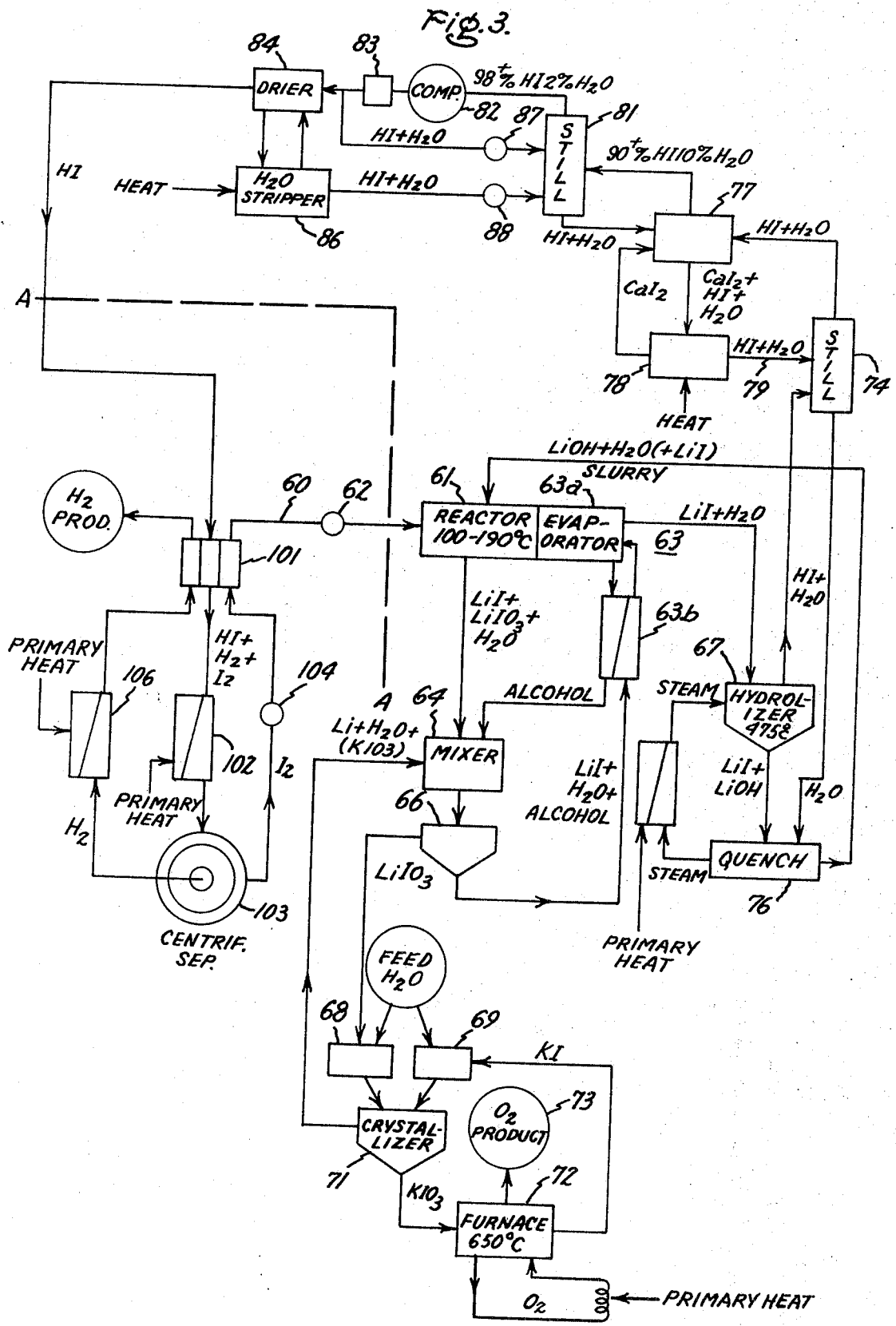

3,839,550
CLOSED-CYCLE THERMOCHEMICAL PROCESS
FOR THE DECOMPOSITION OF WATER
Robert H. Wentorf, Jr., Schenectady, N.Y., assignor to
General Electric Company
Filed June 28, 1973, Ser. No. 374,536
Int. Cl. C01b 1/00, 13/00
U.S. Cl. 423—579        9 Claims

ABSTRACT OF THE DISCLOSURE

A multi-step closed-cycle thermochemical process for the generation of hydrogen and oxygen by the decomposition of water is described utilizing I—Li—K—O—H chemistry in combination with a subcycle in which either nickel or cobalt chemistry or heat is employed for the decomposition of hydriodic acid. Iodine compounds are formed and decomposed in a cyclic manner with water and high temperature heat being fed into the process and hydrogen, oxygen and low temperature heat being extracted from the process. For the process in which nickel is employed in a subcycle, the main steps of the process are: (1) the cracking of $NiI_2$ to Ni and $I_2$ at about 700° C., (2) the reaction of $I_2$ with aqueous LiOH to make LiI and $LiIO_3$, (3) the separation of $LiIO_3$, its conversion to $KIO_3$ by reaction with KI, and the thermal cracking of $KIO_3$ to KI and oxygen, (4) the hydrolysis of LiI to LiOH and hydriodic acid, and (5) the reaction of Ni with hydriodic acid to form $NiI_2$ and hydrogen.

BACKGROUND OF THE INVENTION

Concern has already been expressed that a major energy crisis is expected to occur in the United States in the next ten to fifteen years. Although the crisis may be alleviated by the massive import of oil and gas, such a solution would greatly aggravate the already serious problem of balance of payments faced by the United States. One far more desirable solution that has been proposed is the large scale production of hydrogen.

Hydrogen usage in the United States has grown at an average annual rate of 15% for the past 25 years. Large scale use of hydrogen is currently restricted to ammonia production (42%), hydrocarbon refining (38%), metallurgical (about 7%), and food processing (about 5%).

At least five methods for the production of hydrogen have reached a substantial level of usage:

(a) natural gas reforming methods,
(b) the reforming of petroleum naphthas,
(c) partial oxidation of hydrocarbons,
(d) the reforming of coal or coke and
(e) the electrolysis of water.

Of these methods, the reforming of natural gas is the most economical. Reformed gaseous industrial grade hydrogen is at present typically priced in the range 75–90¢/million B.t.u. However, the sharp rise in prices expected to occur for methane and similar petroleum products due to the pending massive shortage will scale this price up to a substantially higher value in the future.

It will be particularly desirable to provide new multi-step closed-cycle thermochemical processes in which, ideally, only high temperature heat and water are added to the system and hydrogen, oxygen and low temperature heat are removed therefrom. The maximum operating temperature should not exceed about 1100° K. (a maximum value roughly equal to the temperature of steam deliverable by high temperature gas-cooled nuclear reactor technology).

The Euratom thermochemical hydrogen process (referred to as the Mark I process) has been proposed as one such process. The Mark I process uses calcium bromide and mercury to decompose water. The maximum temperature required has been indicated as being 727° C., the temperature attainable in the steam discharge from a high temperature gas reactor.

The Mark I process has major disadvantages including the high cost of mercury and the volatility thereof. The loss of significant amounts of mercury to the atmosphere appears certain to occur in the course of repeated cycling adding to the expense of the process and creating a severe ecological hazard.

It is the prime object of this invention to provide an improved multi-step closed-cycle thermochemical process not only satisfactorily meeting the above thermodynamic constraints, but also meeting constraints relating to kinetics, ecological and safety factors, economics, reliability and material availability.

SUMMARY OF THE INVENTION

A multi-step closed-cycle thermochemical process for the generation of hydrogen and oxygen by the decomposition of water is described utilizing I—Li—K—O—H chemistry in combination with a subcycle in which either nickel or cobalt chemistry or heat is employed for the decomposition of hydriodic acid. Iodine compounds are formed and decomposed in a cyclic manner with water and high temperature heat being fed into the process and hydrogen, oxygen and low temperature heat being extracted from the process. For the process in which nickel is employed in a subcycle, the main steps of the process are: (1) the cracking of $NiI_2$ to Ni and $I_2$ at about 700° C., (2) the reaction of $I_2$ with aqueous LiOH to make LiI and $LiIO_3$, (3) the separation of $LiIO_3$, its conversion to $KIO_3$ by reaction with KI, and the thermal cracking of $KIO_3$ to KI and oxygen, (4) the hydrolysis of LiI to LiOH and hydriodic acid, and (5) the reaction of Ni with hydriodic acid to form $NiI_2$ and hydrogen.

BRIEF DESCRIPTION OF THE DRAWING

The exact nature of this invention as well as other objects and advantages thereof will be readily apparent from consideration of the following specification related to the annexed drawing in which:

FIG. 1 is a flow diagram of the multi-step closed-cycle thermochemical process of this invention employing a subcycle utilizing nickel or cobalt chemistry for the decomposition of hydriodic acid and FIGS. 2 and 3 are flow diagrams similar to the flow diagram of FIG. 1 in each of which a subcycle is employed utilizing the thermal decomposition of hydriodic acid.

DESCRIPTION OF THE PREFERRED EMBODIMENT

Figure 1:
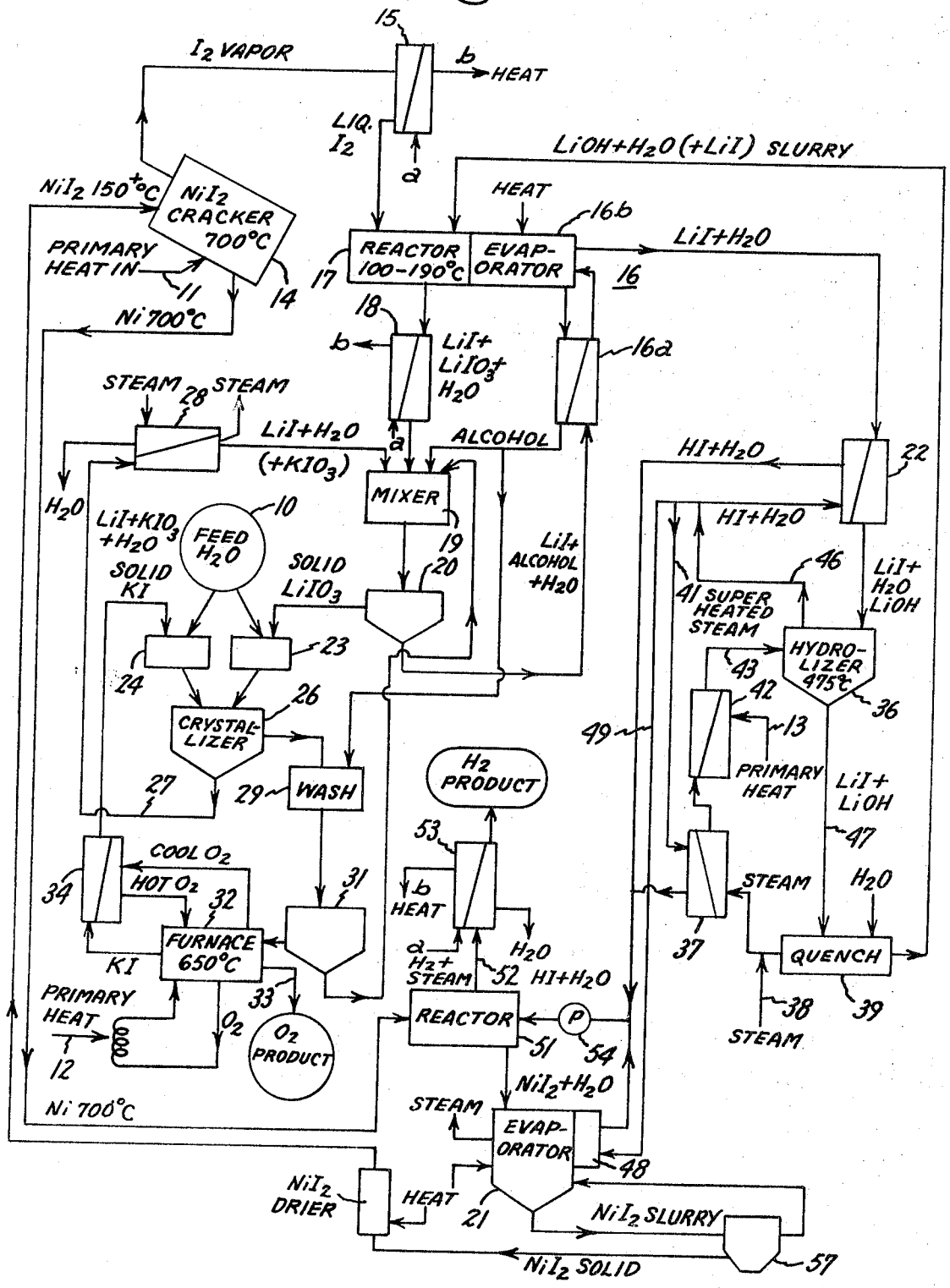

The inputs to the closed-cycle processes shown in the drawing are water and heat (labelled "primary heat"). The entry point for water into the system is indicated by the numeral 10 and heat flow entering the system is identified by arrows 11, 12, 13. The heat flow may be provided, for example, by steam output from a nuclear reactor of the water-cooled, liquid metal-cooled or high temperature gas types. Heat is carried through the system with the various reaction products and materials brought into heat exchange relationship therewith.

As is shown in FIG. 1, cracking of $NiI_2$ is accomplished in reactor 14 at a temperature in excess of 550° C., preferably at 700° C., 0.12 atmosphere. Reactor 14 may be a sloping kiln into which anhydrous $NiI_2$ is admitted to the cooler upper end of the kiln at 150–200° C. The lower end of the kiln is maintained at 700° C. by primary heat input (750° C.) and the decomposition proceeds according to the reaction:

(1)  $NiI_2 \rightarrow Ni + I_2$.

Mechanical scrapers are preferably used to agitate the solids in the kiln. The kiln is sealed and maintained at a pressure of about 0.12 atmospheres, the vapor pressure of iodine at its melting point (113.6° C.). As $NiI_2$ proceeds down the kiln, it is heated by the hot iodine vapor moving upwardly from the decomposition proceeding in the hot end and, also, by condensation of $NiI_2$ vapor. The final heating for actual decomposition takes place by combined radiation, convection and conduction from the hot walls of the kiln. The kiln is refractory lined with a material having good thermal conductivity, such as alumina. Exit streams from reactor 14 consists ideally of iodine vapor at about 0.12 atm., 125–150° C. and nickel sponge at 700° C.

The iodine vapor is conducted to heat exchanger 15 in which the iodine vapor is condensed to the liquid state at about 115° C. by giving up its heat to a fluid such as water or oil. The heated stream of fluid may be used in another part of the process, e.g., to evaporate ethanol in evaporator 16 as will be described hereinbelow. The hot, liquid iodine is added to a slurry (about 100° C.) of LiOH, LiI, and water resulting from quenching with water of the product stream of the hydrolysis of LiI, described hereinbelow. The reaction between the liquid iodine and the slurry in reactor 17 takes place at temperatures in excess of about 80° C., preferably in the 100–190° C. range. At the latter temperatures, the reaction is limited only by the diffusion of iodine.

The reaction occurring in reactor 17 is expressed by the equation:

(2)  $3I_2 + 6LiOH \rightarrow 5LiI + LiIO_3 + 3H_2O$.

The heat evolved in this reaction, about 14.7 kcal. per 0.333 mol of $LiIO_3$, is used to evaporate ethanol in portion 16b of double-effect evaporator 16. The exit stream from reactor 17 consists of a mixture of LiI, $LiIO_3$ and $H_2O$ in a molar ratio of about 8:1:10.5, assuming two-thirds conversion of LiI to LiOH in the hydrolysis to be described hereinbelow. Cooling of the exit stream from about 90° C. to about 30° C. is accomplished in heat exchanger 18 by external cooling water and/or a cooler fluid stream from within the system.

Thereafter, in mixer 19 about 2 mols of ethanol per mol of LiI are added to the cooled mixture from heat exchanger 18. In the precipitation that occurs in mixer 19, virtually all the $LiIO_3$ and any KI (or $KIO_3$) are precipitated. This solution is then filtered in separator 20. The LiI/water/ethanol solution is sent from separator 20 to portion 16a of double-effect evaporator 16. The first stage (16a) of the double-effect evaporator 16 is heated by condensing alcohol vapor from the second stage 16b, which in turn is heated by various streams having temperatures in the 100–180° C. range. The heat for these streams comes from their passing in heat exchange relationship with the condensation of iodine in heat exchanger 15, the cooling of reaction 3 discussed hereinbelow, the condensation of steam from evaporation of $NiI_2$ solution (in evaporator 21) etc. The end product leaving evaporator 16 is an aqueous solution of LiI, which is pumped into heat exchanger 22, thereafter to be hydrolyzed to HI and LiOH according to equation (4) hereinbelow.

The solid $LiIO_3$, along with any trace quantities of $KIO_3$ and KI, is passed from separator 20 to mixer 23, where the solid material is dissolved in the minimum amount of water from feed water stream 10 (in part) for later mixing with a solution of KI from mixer 24, this latter solution also being made with a minimum amount of water. Part of the requisite water is condensate from evaporator 16. These two solutions are then mixed and cooled to 0° C. in jacketed crystallizer 26 where a large fraction of the iodate crystallizes as $KIO_3$. Operation at the minimum temperature without freezing is preferred. The LiI still in solution depresses the freezing point below 0° C. Heat exchange (not shown) is employed between the feed to the crystallizing vessel 26 and the cool departing solution.

The remaining solution of lithium and potassium iodides and iodates leaving crystallizer 26 via line 27, after heat exchange with the incoming feed to the crystallizer or passage through any of the many heat exchangers in the system shown with an inlet and outlet marked a and b, respectively, is evaporated in evaporator 28 to near saturation (for a temperature of 26° C.) and then is fed into mixer 19 along with the $LiI + LiIO_3 + H_2O$ stream for mixing with the alcohol.

The solid $KIO_3$ is removed from crystallizer 26 and rinsed with alcohol in washer 29 to free the $KIO_3$ of iodides. After separation of the alcohol solution from the $KIO_3$ in separator 31, the alcohol solution is added to the alcohol solution entering mixer 19. The solid $KIO_3$ leaving separator 31 is fed to decomposing furnace 32 where it is moved through progressively hotter zones and is heated by a hot oxygen gas stream at about 1 atm. pressure passing countercurrent to the $KIO_3$ feed. Decomposition then occurs according to equation (3):

(3)  $KIO_3 \rightarrow KI + 1.5 O_2$.

Part of this oxygen used for the heating operation results from the decomposition of local $KIO_3$ to yield KI, but about 92% of the hot oxygen is constantly being recirculated between furnace 32 and heat exchanger 12, where the oxygen receives heat from the primary heat source e.g. at a temperature of about 750° C. Thus, the oxygen is employed as a heat transfer medium.

As the $KIO_3$ warms up, small quantities of iodine may be released below about 550° C. due to the presence of $LiIO_3$ or iodides. This iodine is carried off in a separate oxygen stream 33, which is scrubbed (not shown) with a small fraction of the LiOH from the hydrolysis of LiI and iodine is removed according to the reaction in equation (2). Part of this scrubbed oxygen gas is drawn off continuously as product oxygen. The $KIO_3$ decomposes actively at its melting temperature, 560° C., to yield pure oxygen and KI (melting temperature 723° C.). The melting and decomposition of the $KIO_3$ requires about 16 kcal. per atom of oxygen. This decomposition may be catalyzed, as by the use of $MnO_2$.

Materials leaving furnace 32 are oxygen and KI. Most of the oxygen leaves the furnace at about 550° C. to be reheated in heat exchanger 12 and returns to the furnace to decompose the $KIO_3$. The solid KI, broken into lumps by carriage along a moving belt, leaves at a temperature of about 650° C. to enter heat exchanger 34, where it gives up most of its heat passing countercurrent to an oxygen stream proceeding from the cooler end of furnace 32. The KI is finally cooled from about 90° C. to about 30° C. by exposure to the ambient air. The cooled solid KI is then conducted to mixer 24, where more KI solution is prepared.

$KIO_3$ is unusual in its decomposition (decomposes cleanly at 450–600° C. to KI and oxygen) in contrast to the iodates of calcium, barium, lithium or magnesium. When the iodates of calcium, barium or lithium are heated to 700° C., they form paraperiodates, which retain 40% of the original oxygen and are insoluble in water or in iodine-water. Magnesium iodate decomposes completely to MgO, $I_2$ and $O_2$, but it is difficult to prepare from MgO and $I_2$ because MgO is such a weak base.

The fact that $KIO_3$ decomposes in a favorable manner offers several advantages. Thus, relatively easily handled oxygen can be used as heat transfer medium during the decomposition, the solid product KI is quite soluble in water, $KIO_3$ is not very soluble in cold water and is relatively insoluble in common alcohols, such as methanol, ethanol or propanol. Both KI and $KIO_3$ are quite insoluble in a rich-alcohol, lean-water solution fairly well saturated with LiI. This fact makes it possible to keep potassium out of the lithium loop.

The hydrolysis reaction in the lithium loop is set forth in equation (4).

(4) $\quad\quad\quad LiI + H_2O \rightarrow LiOH + HI.$

This reaction proceeds at about 475° C. (1 atm.). Both LiI and LiOH are molten at 475° C. and both the melt and the hydrolysis vapors are quite corrosive. Pyrolytic carbon is a particularly suitable material for the construction of apparatus exposed to these conditions. Other materials such as alumina, magnesia, tantalum and molybdenum are somewhat less able to resist corrosion by the melt and vapors during reaction 4.

The heat necessary to support the process can be supplied using superheated steam. Thus, superheated steam for heating the hydrolysis reaction in reactor 36 is prepared by directing steam to enter heat exchanger 37, e.g. as flows from conduit 38 (steam from elsewhere from the system) and from quench tank 39. The makeup steam for hydrolysis in reactor 36 may be obtained from evaporation of solutions of $NiI_2$ (evaporator 21) and LiI in heat exchanger 28.

In heat exchanger 37 the steam receives initial further heating from a hot (about 475° C.) $HI + H_2O$ flow via line 41. The steam flow then enters heat exchanger 42 in which the temperature of the steam is raised to 500° C. by the flow therethrough of primary heat fluid at a temperature of about 750° C. The superheated steam so heated is conducted to hydrolysis reactor 36 via line 43. Thermodynamic calculations for the reaction indicate that the heat of reaction is only a few kilocalories and the equilibrium favors steam more than HI.

The feed to reactor 36 consists of a concentrated solution of LiI in $H_2O$ (together with a small amount of LiOH), which is pre-heated to about 450° C. by part of the exit vapors (HI and $H_2O$) from heat exchanger 22. This feed stream is flashed (by dropping the pressure thereof to 1 atm.) from the high pressure held upon it in heat exchanger 22 to yield a large reaction surface and is mixed with more steam (via conduit 43), which has been superheated to 500° C. at 1 atm. About 6.5 kcal./mol of $H_2$ of outside heat is needed. Both outgoing streams ($HI + H_2O$ via conduit 46 and a molten mixture of LiI and LiOH via conduit 47) are at about 475° C.

The molten salt mixture is quenched with a limited amount of hot water (condensate from elsewhere in the system) sufficient to dissolve the LiI and carry the LiOH as a slurry at 100° C. after about half of the quenching water has been converted to steam. The steam, after being superheated by passage through heat exchangers 37, 42, is returned to the hydrolysis reaction in reactor 36. The Li-$H_2O$-LiOH slurry is fed to reactor 17 as noted hereinabove in connection with equation (2) for reaction with iodine.

The hot HI and steam vapors leaving reactor 36 via conduit 46 will contain about 6 or more mols of $H_2O$ per mol of HI. This composition would be richer in water than the one atmosphere HI/$H_2O$ azeotrope boiling at 127° C. Some of these hot vapors (via conduit 41 and heat exchanger 37) are condensed to heat incoming steam for the hydrolysis, some are used to pre-heat the LiI feed in heat exchanger 22 and some are conducted to steam jacket 48 via conduit 49 to evaporate water from the $NiI_2$ solution in evaporator 21 (100–150° C.). Approximately 6.5 kcal. of heat at 550° C. must be put into superheating steam for every 2 g.-mols of HI formed in reaction 4.

The formation of $NiI_2$ is carried out in hot aqueous solution in reactor 51 at pressures exceeding 1 atm. (e.g. 10 atms.) in accordance with the reaction in equation (5):

(5) $\quad\quad\quad 2HI + Ni \rightarrow NiI_2 + H_2.$

An aqueous solution is needed to keep the fresh Ni exposed to HI. Several advantages are obtained by using a higher reaction pressure:

(a) The hydrogen is produced at a higher pressure without need to expend mechanical work of compression.
(b) The hydrogen is easier to free from water or other impurities because the equilibrium concentrations thereof are lower.
(c) The solution can be held at a higher temperature to use heat more efficiently.
(d) The product $NiI_2$ is more soluble at higher temperatures and, as a result, less inert water is needed.
(e) The reaction runs faster at higher temperature.

The ferromagnetic properties of nickel can be used to advantage in the reactor design, because magnetic forces can be used for stirring and, as well, for holding nickel in strategic positions, where it can scrub the HI from the departing gases and liquid.

Approximately 28 kcal. of heat are evolved per g.-mol of $H_2$ formed, this heat leaving the reactor in the form of steam (10 atm. and 180° C.) with the hydrogen via conduit 62. This outgoing steam is condensed in condenser 53, the heat received therefrom may be used (not shown) to aid in the evaporation of water from $NiI_2$/$H_2O$ solution in evaporator 21.

Nickel input as granular sponge from cracker 14 to reactor 51 is made via a pressure lock (not shown) at a temperature of about 700° C. while the aqueous HI is admitted via pump 54 (providing the necessary pressure) at 125° C. The hydrogen and steam evolved at 10 atms. are scrubbed with Ni (not shown) in the top of the reactor 51 to remove HI and are then used for heating other streams as described hereinabove. Condensation in condenser 53 removes most of the water from the hydrogen stream and the balance is removed by absorption or adsorption (not shown) to yield substantially pure hydrogen.

The $NiI_2$ leaves reactor 51 at 180° C. as a liquid bearing at least about 8.5 mols of $H_2O$ per mol of $NiI_2$. Upon entering evaporator 21 (1 atm.) the solution flashes to yield steam and $NiI_2$ slurry. The heat for this operation is obtained from the sensible heat in the incoming stream together with the heat furnished by condensing steam from the hydrogen stream in heat exchanger 53 as indicated hereinabove. In addition, some 8.5 kcal. per mol of $H_2$ of extra heat (assuming no multiple effect evaporation is used) is needed at about 180° C. for operation of the evaporator at the proper temperature (about 150° C.). The $NiI_2$ slurry leaving evaporator 21 is conducted to separator 57 to separate the $NiI_2$ from the liquid as by filtration or centrifugation. The solid $NiI_2$ is dried to about 200° C. (note 150° C. on the drawing) at 0.12 atms. to reduce the water content thereof. The dried solid $NiI_2$ is then fed to kiln 14. Care must be taken to exclude oxygen from contact with the $NiI_2$.

Materials of construction for evaporator 21, reactor 52 etc. can be made of conventional acid-resistant material, such as glass, polytetrafluoroethylene etc.

In a process (FIGS. 2 and 3) similar to that described hereinabove, decomposition of the hydriodic acid to yield iodine is accomplished thermally, rather than by the use of nickel or cobalt. In the same general manner, liquid iodine condensed from the decomposition reaction is conducted by a conduit 60 to reactor 61 (temperature 100–190° C.) via pressure reducer 62. The hot, liquid iodine is added to a slurry of $LiOH + H_2O$ ($+ LiI$) in reactor 61, the slurry resulting from the quenching with water of the product stream from the hydrolysis of LiI (as in reaction 4).

Exothermic reaction 2 is conducted in reactor 61 and the heat evolved is used to evaporate ethanol (or other low molecular weight alcohol) in portion 63a of double-effect evaporator 63. The exit stream (LiI, $LiIO_3$ and $H_2O$) is cooled (not shown) to about 30° C. and introduced into mixer 64 for precipitation with ethanol. Virtually all of the LiIO₃ and any KI (or KIO₃) are precipitated in this step and the resulting mixture passes to separator 66. The LiI/water/ethanol solution from separator 66 passes to portion 63b of double-effect evaporator 63, the operation of which is the same as that of evaporator 16 (FIG. 1). The stream leaving evaporator 63 is an aqueous solution of LiI, which is pumped to hydrolysis reactor 67 via a heat exchanger (not shown).

The solid LiIO₃, along with any trace quantities of KIO₃ and KI, is passed from separator 66 to mixer 68 for the addition thereto of a minimum amount of water, a part of which is feed water entering the system. This solution is mixed and cooled (to 0° C.) together with a solution of KI in water from mixer 69 in jacketed crystallizer 71. A large fraction of the iodate crystallizes therein as KIO₃. Heat exchange relationships and material inputs and removals are as described hereinabove in connection with FIG. 1.

The remaining solution of lithium and potassium iodides and iodates leaving crystallizer 71 is returned to mixer 64, after utilization of the stream in various heat exchange relationships (not shown) as described in connection with FIG. 1.

The solid KIO₃ is removed from crystallizer 71 and decomposed to yield KI in furnace 72 utilizing oxygen as a heat exchange fluid as described hereinabove in connection with furnace 32. Processing of the solid KIO₃, after leaving crystallizer 71, is as described in connection with crystallizer 26. After removal of iodine therefrom, scrubbed oxygen gas is drawn off continuously as product oxygen as shown at 73. The solid KI leaving furnace 72 is returned to mixer 69 (after being cooled as described in connection with FIG. 1), where more KI solution is prepared.

The hydrolysis reaction [equation (4)] proceeds at about 475° C. in reactor 67 and requires the input of superheated steam (about 500° C.) preferably generated in the same manner as described hereinabove in connection with the operation of reactor 36.

The feed to reactor 67 consists of a concentrated solution of LiI in H₂O (together with a small amount of LiOH) pre-heated to about 450° C. by the exit flow of HI+H₂O passing from reactor 67 to still 74. Both the outgoing flow of HI+H₂O and the outgoing flow of LiI+LiOH are at about 475° C.

Quenching of the molten mixture of LiI and LiOH is accomplished in quench tank 76 utilizing condensed water from still 74. This quenching operation produces the slurry [LiOH+H₂O(+LiI)] that passes to reactor 61.

The hot HI and steam vapors leaving reactor 67 have a composition of about 6 to 60 mols of H₂O/mol of HI. After distillation thereof, some of the water will have been removed producing the HI/H₂O azeotrope boiling at 127° C. as an outgoing stream. This azeotrope (about 57% HI by weight) is subjected to the action of a non-oxidizing dehydrating agent, such as CaI₂ or concentrated phosphoric acid. The dehydration is conducted in vessel 77 and yields an outgoing flow of at least about 90% by volume HI, the rest being water. The other product stream (e.g. CaI₂+HI+H₂O) is conducted to evaporator 78 where heat (from some other part of the system) is used to drive off water from the dehydrating agent, which is then recirculated to vessel 77. Line 79 provides for the return of H₂O containing dissolved HI to still 74.

The outgoing HI/H₂O flow from vessel 77 is conducted to still 81, where additional distillation results in an outgoing stream of HI/H₂O (60° C.) that is greater than 98% by volume HI. This stream is conducted to compressor 82. After being compressed to a pressure in the 10-60 atm. range and passing through cooler 83, the almost dry pressurized HI flow is conducted to drier 84, which contains silica gel or molecular sieve material or other dehydrating agent to remove the last vestiges of water from the HI flow. The dehydrating agent is circulated to and from stripper unit 86 and heated to about 200° C. to separate the water from the dehydrating agent. Return flows of HI+H₂O of various concentrations are returned from still 81 to vessel 77, from downstream of cooler 83 to still 81 and from stripper 86 to still 81. The latter two flows must pass through reducing valves 87 and 88, respectively. The dry pressurized HI flow leaving drier 84 passes to heat exchanger 89, where it is pre-heated before entry to cracker 91 to effect thermal decomposition of HI expressed in equation (6):

(6) $\qquad 2HI \rightleftharpoons H_2 + I_2.$

The thermal decomposition is conducted at about 550° C. and the outgoing flow of H₂, I₂ and HI, are in approximate component proportions of 1, 1, 2 mols, respectively. These hot gases are passed into heat exchanger 89 for the pre-heating of the HI flow. As these gases are cooled, liquid iodine is formed and removed via line 60. The cooled HI/H₂ gas flow then passes to the HI scrubber 92, where the hydrogen is removed at a temperature of about 40° and the prevailing high pressure (10-60 atms.). Separation of the flow components is accomplished in scrubber 92 by the introduction of concentrated phosphoric acid or molecular sieve material via line 93. The attraction of this scrubbing material for HI is much greater than the attraction thereof for hydrogen. As a result, the HI and the scrubbing agent are passed to HI-stripper 94, which is heated to about 200° C. utilizing heat produced elsewhere in the system. This heating effects the separation of the HI and the stripping material, the HI leaving stripper 94 via line 96 to be added to the HI flow from drier 84.

Thus, by this process utilizing reactions displayed in equations (2), (3), (4) and (6), process feed water entering the system at mixer 68 and 69 is decomposed to yield oxygen and hydrogen in the same general manner as this decomposition occurs in connection with the above-identified process utilizing the equations (1), (2), (3), (4) and (5).

An alternate system to that described in FIG. 2 is set forth in FIG. 3. The process described in connection with FIG. 2 from the step of introducing liquid iodine into reactor 61 to the step of producing dry pressurized HI gas remains the same. The change is primarily directed to the utilization of different apparatus to accomplish the thermal decomposition of the pressurized HI flow resulting in the production of the product hydrogen and liquid iodine. Thus, the difference between the systems of FIGS. 2 and 3 is limited to the portions below and to the left of match line A—A.

In FIG. 3, the pressurized dry HI flow leaving drier 84 is conducted to reactor 101 wherein the HI flow is heated to initiate the decomposition reaction (6) yielding a mixture of HI+H₂+I₂ that is passed to and further heated in heat exchanger 102. This additional heat helps to shift reaction (6) to the right to encourage the production of hydrogen. This heated gas mixture at a temperature of about 600° C. enters centrifugal separator 103, which produces a separating field of at least 10⁴ that of the earth's gravitational field. A separation is thereby accomplished between the very light hydrogen and the heavier iodine vapor and HI gas. The HI gas continues to thermally decompose in separator 103 producing more H₂ and iodine vapor. The hydrogen and iodine leave separator 103 at a temperature of about 550° C. The iodine vapor passes through a reducing valve 104 and then gives up additional heat in a jacketed portion of reactor 101. Liquid iodine leaves reactor 101 via line 60 and, after further reduction in pressure at reducing valve 62, it is passed to reactor 61.

The hydrogen stream leaving centrifugal separator 103 is reheated in heat exchanger 106, and, thereby, serves as a heat exchange medium for maintaining the requisite decomposition temperature in reactor 101, the hydrogen product passing through a jacketed portion thereof.

Thus, by the utilization of a series of chemical reactions, not otherwise related, a net reaction results expressed in the following equation:

$$2H_2O \rightarrow 2H_2 + O_2,$$

all of which is accomplished in a closed-cycle thermochemical process.

Although rubidium and cesium (as iodides and iodates) are operable substitutes for potassium (iodide and iodate), these materials are much less likely to be used, because of the cost thereof.

The term "water" as used in the claims is intended to encompass both the liquid and the vapor states.

What I claim as new and desire to secure by Letters Patent of the United States is:

1. The process for the generation of hydrogen and oxygen from water comprising the steps of:
   (a) hydrolyzing lithium iodide to produce lithium hydroxide and hydriodic acid,
   (b) removing the hydriodic acid from the hydrolysis reaction zone,
   (c) reacting aqueous lithium hydroxide from step (a) with iodine to produce an aqueous mixture of lithium iodide and lithium iodate,
   (d) separating the lithium iodide from the lithium iodate, said lithium iodide being used for step (a),
   (e) reacting the lithium iodate in the presence of water with the iodide of a metal selected from the group consisting of potassium, rubidium and cesium,
   (f) separating iodate of the metal selected from the lithium iodide and water,
   (g) thermally decomposing the metal iodate so separated to yield oxygen and the iodide of the selected metal, at least some of the oxygen being continuously removed from the system and the metal iodide being used in step (e),
   (h) converting the hydriodic acid to hydrogen and iodine, the hydrogen being continuously removed from the system and collected and the iodine being used in step (c) and
   (i) continuously introducing water into the system.

2. The process of claim 1 wherein the metal selected is potassium.

3. The process of claim 1 wherein the conversion of hydriodic acid to hydrogen and iodine is by thermal decomposition.

4. The process of claim 1 wherein in the conversion of hydriodic acid to hydrogen and iodine, the hydriodic acid is reacted with a second metal selected from the group consisting of nickel and cobalt to produce hydrogen and the iodide of said second metal, and the second metal iodide is in turn thermally decomposed to yield iodine and said second metal.

5. The process of claim 1 wherein the lithium iodide is hydrolyzed with superheated steam.

6. The process of claim 1 wherein aqueous lithium iodide and lithium iodate are separated by adding an alcohol thereto.

7. The process of claim 1 wherein oxygen produced during thermal decomposition of the metal iodate is used as a heat exchange medium, being removed from the iodate decomposition zone, heated to about 700° C. and returned to said iodate decomposition zone.

8. The process of claim 1 wherein the water introduced into the system is, at least in part, liquid.

9. The process of claim 1 wherein the hydrogen recovered from the system is under a pressure of at least about 10 atmospheres.

References Cited
UNITED STATES PATENTS

| | | | |
|---|---|---|---|
| 3,490,871 | 1/1970 | Miller et al. | 423—657 |
| 3,594,124 | 7/1971 | De Beni | 423—648 |
| 3,607,066 | 9/1971 | Basch et al. | 423—579 |
| 3,761,352 | 9/1973 | Souriau | 423—579 |

OTHER REFERENCES

"Hydrogen Sought Via Thermochemical Methods," Chemical and Engineering News, Sept. 3, 1973, pp. 32–33.

JOHN H. MACK, Primary Examiner

A. WEISSTUCH, Assistant Examiner

U.S. Cl. X.R.

423—644, 648, 657